United States Patent [19]

Liddy et al.

[11] Patent Number: 5,719,091
[45] Date of Patent: Feb. 17, 1998

[54] ZIROCONIA BASED OPACIFIERS

[76] Inventors: Matthew Jon Liddy, c/-15 Bank Street, South Melbourne, VIC 3205; Ross Alexander McClelland, Lot 136, Murrawong Road, Maryknoll, VIC 3812; Michael John Hollitt, 80 Tyne Street, Box Hill North, VIC 3129, all of Australia

[21] Appl. No.: 564,275

[22] PCT Filed: Jun. 30, 1994

[86] PCT No.: PCT/AU94/00366

§ 371 Date: Jul. 9, 1996

§ 102(e) Date: Jul. 9, 1996

[87] PCT Pub. No.: WO95/01313

PCT Pub. Date: Jan. 12, 1995

[30] Foreign Application Priority Data

Jun. 30, 1993 [AU] Australia ................... PL9706

[51] Int. Cl.$^6$ ................... C04B 35/48; C03C 8/20
[52] U.S. Cl. ................... 501/104; 501/14; 501/103; 501/106; 106/450
[58] Field of Search ................... 501/103, 104, 501/106, 14; 106/450

[56] References Cited

U.S. PATENT DOCUMENTS

| | | | |
|---|---|---|---|
| 3,222,197 | 12/1965 | Sibert et al. | 501/106 |
| 3,577,252 | 5/1971 | Brugger | 106/451 |
| 3,899,346 | 8/1975 | Ferrigno | 106/450 |
| 4,046,589 | 9/1977 | Higgins | 106/450 |
| 4,482,390 | 11/1984 | Airey et al. | 501/14 |
| 4,822,575 | 4/1989 | Ngian et al. | 106/450 |
| 5,318,765 | 6/1994 | Binder et al. | 106/450 |
| 5,330,571 | 7/1994 | Speer et al. | 106/450 |
| 5,389,402 | 2/1995 | Speer et al. | 106/450 |

FOREIGN PATENT DOCUMENTS 1730062  4/1992  U.S.S.R. .

*Primary Examiner*—Mark L. Bell
*Assistant Examiner*—Louis M. Troilo
*Attorney, Agent, or Firm*—Dennison, Meserole, Pollack & Scheiner

[57] ABSTRACT

A process for producing a zirconia bearing opacifier is disclosed. The process comprising the steps of: (I) heat treatment of a zirconia bearing material comprising heating the zirconia bearing material in the presence of an additive to form a heat modified product having one or more phases which, when incorporated in a glaze and the glaze fired, exhibit opacifying characteristics; and (ii) cooling the heat modified product to produce a product which can be used for imparting opacity.

19 Claims, No Drawings

ZIRCONIA BASED OPACIFIERS

This invention relates to the formation of a glaze opacifier from zirconia bearing feedstocks.

In a particular embodiment the present invention provides a process for the production of a glaze opacifier from zircon mineral or other zirconia bearing materials. In a general aspect the process of the invention comprises two basic steps, namely:

1. A thermal treatment step which has the effect of distributing zirconia either as fine particles of zirconia in other phases or into a phase which is readily chemically accessible.
2. An optional leaching step which has one or more of the effects of increasing the concentration of zirconia, removing deleterious impurities or decomposing chemically accessible phases into new forms which may have greater influence on the opacifying effect.

Additional steps may be employed as will be described below.

It is common when glazing or enamelling items such as tiles, tableware and sanitaryware for an opacifier to be added into the glaze. The opacifier has the effect of completely obscuring from visual observation the surface below the glaze layer. While a number of additives are known to have an opacifying effect the most commonly used materials contain zirconia. It is common for glazes where an opacification effect is desired to have 1–10% by weight of zirconia as determined by chemical analysis.

The main mechanism which is active in imparting opacity to glazes is in the distribution of micron to submicron particles of a material having high refractive index in the glassy matrix of the glaze. This arrangement is excellent for scattering light within the glaze layer, and thereby preventing incident light from reaching the underlying body. Zirconia bearing additives form zircon (zirconium silicate) particles in the glaze, which if properly sized and distributed can have a strong opacifying effect, since zircon has a much higher refractive index than the glassy matrix of the glaze and has very limited solubility in the glassy matrix.

The major aim of techniques for the production of zirconia bearing opacifying additives for use in glazes is the production and distribution within the glaze of micron to submicron sized particles of zircon. Two techniques have been found to be generally effective. In the first zircon is "micronised", i.e. milled to produce a size distribution in which a considerable proportion of the material is in the 0.1 micron to 2 micron particle size range. This zircon is then added by various application methods with other glaze constituents (either in a separate layer or in admixture, or both) to the body to be glazed. The body and the glazing layer are then fired together, during which the glaze fuses to a glassy matrix within which the fine zircon particles are suspended. In the second technique zirconia which has been dissolved in a glass formed at high temperature is chemically precipitated as zircon upon curing of the glass during subsequent firing at lower temperature. Hence incorporation of the glass into glaze formulations can cause precipitation of zircon during firing, resulting in an ultrafine suspension of well distributed zircon particles.

Both of these methods for producing opacity based on zircon suspension in glazes are expensive per unit of zircon having an opacifying effect. In the case of milling to produce micronised zircon the process lacks intensity, owing to the high milling energy requirements for zircon generally, and the fine grinding duty. Further, radioactive elements present in the zircon in low concentrations can represent a health hazard through inhalation in handling of the very finely ground material. Capital charges and operating costs are high. In the case of zircon dissolution into glass the solubility of zircon is low, requiring high dilution with other glass constituents and high glass formation temperatures. Typically such operations are small, also having high capital and operating costs per unit of production. Costs for each of these techniques are sufficiently high that the cost of the zircon which acts as the opacifying agent is usually only a small proportion of the price of opacifier, taken per unit of zircon.

Clearly there is a considerable incentive to discover alternative methods for the suspension of micron sized particles of zircon into glazes.

Accordingly the present invention provides a process for the production of an alternative zirconia bearing opacifier, which process comprises the steps of:

(i) thermal treatment of a zirconia bearing material comprising heating the zirconia bearing material in the presence of an additive to form a heat modified product comprising one or more new phases which, when incorporated in a glaze and the glaze is fired, exhibit opacifying characteristics; and (ii) cooling the heat modified product of step (i) to produce a product which can be used for imparting opacity.

It has been discovered that the zirconia bearing opacifier product of the above-described process, conducted as herein disclosed, may have the ability to impart opacity to a glaze which incorporates the zirconia bearing opacifier without the need for prior micronising or other treatment aimed at ensuring the production of micron to submicron sized particles in the glaze. Milling that may be necessary for the zirconia bearing opacifier product of such a process is simply to ensure adequate mixing with other glaze constituents rather than to produce and distribute fine particles.

It is preferred that the additive have the effect of encouraging the thermal decomposition of the zirconia bearing material to other phases.

It is preferred that the additive be added to the zirconia bearing material prior to the thermal treatment step.

The additive may include, but is not limited to, any metal oxide which exhibits a chemical preference for the formation of compounds or liquids with silica rather than zirconia, or any compound which decomposes to a metal oxide or any other additive having the same effect. In particular, oxides of elements which are classified as being in Groups I end II of the Periodic Table (i.e. alkali and alkali earth elements) have been found to be effective, although many other silicate forming oxides will have similar effectiveness.

A range of other additives may also be beneficial. For example, silica itself and a range of fluxes may be useful additives. Additives may be used in combination. Compounds of additives may be used in place of mixtures of additives. Mineral species may be used as the source of one or more desired additive.

Art effective zirconia bearing material to the process is mineral zircon which is readily available as a by product of processing titanium minerals.

The temperature of the thermal treatment step may be from 800° C. up to 1800° C. depending on the additives used and the method of additive incorporation. The thermal treatment step may produce a product which consists in part of a liquid phase at the temperature of the thermal treatment step or may be entirely a solid phase. The presence of a small amount of liquid phase has been found to be beneficial in reducing the time required for completion of reactions in thermal processing. The thermal treatment step my be under any gaseous atmosphere conditions, including fully oxidised or strongly reducing. Feed preparation for the thermal treatment step may range from direct mixing with additives prior to charging to the thermal treatment step, through the formation of agglomerates or nodules of mixed products, to briquette production from the zirconia bearing material and the additives chosen. Solid fuel such as coal or coke may also be charged into the thermal treatment step.

The thermal treatment step may be carried out in any suitable device, including fluidised beds; stationary and moving grate kilns, rotary kilns and plasma flames and furnaces. The presently preferred apparatus is a rotary kiln due to its ability to easily accommodate liquid phases and to operate efficiently over wide ranges of maximum temperature.

The degree of conversion of the zirconia bearing material to other phases in the thermal treatment step may be dependent on the level of additive addition, which will ultimately be a function of the most economic means of producing the desired level of opacification. Typically, where zircon is the zirconia bearing material, less than 30% by weight of additives is necessary for maximum technical effect. However, under some circumstances it will be effective to add larger quantities of additives where such additives reduce the need for incorporation of other glaze ingredients into glaze formulations.

The thermal treatment step residence time at temperature will depend on the nature of the additives and the operating temperature. Residence times of from 30 minutes to 5 hours have been found to be effective.

The cooling step for the heat modified product formed by the thermal treatment step may be conducted to any suitable temperature, (e.g. less than 300° C.) in any suitable cooling device, including fluidised bed cooling or cooling in a water cooled rotary cooler. Cooling may also be conducted by direct quenching with water sprays or by discharge into a water filled sump. Quenching has been found to be effective in the removal of orange and yellow colour effects associated with impurities such as rare earth elements in the zirconia bearing material. These colour effects have been found to develop upon slow cooling in many circumstances, and may lead to glaze discolouration in product applications.

Following the cooling step, the product produced may be submitted to one or more of the following optional process steps:

(iii) chemical treatment:
  (a) for removing impurities such as colorants which may be deleterious in the preparation of glaze formulations; and/or
  (b) for decomposing phases to enhance opacifying effects; and/or
  (c) for selective removal of additives;
but in each case without necessarily significant removal of zirconia or other useful glaze forming constituents such as silica;
(iv) separation of the product of step (iii) from the removed impurities;
(v) Washing the product of step (iv);
(vi) drying and calcining the product of step (v) for removal of retained moisture and production of a dry powdered product.

A preferred chemical treatment step is leaching with a mineral or organic acid.

Prior to leaching the product may be crushed or ground, depending on roasting pretreatment, in order to provide a size distribution suitable for the leaching stage.

Leaching may be conducted in any suitable batch or continuous leach vessel. For example, heated, agitated vessels or fluidised bed vessels may be used.

Typically the leaching temperature will be 20°–150° C., depending on the additive and the leachant.

Pressure leaching may also be employed.

The leaching time may be from 10 minutes to 10 hours, depending on the nature of additives, the temperature and time of thermal treatment and the chosen leachant and its temperature and concentration.

Any acid my be used in acid leaching, although hydrochloric acid, nitric acid and strong organic acids are preferred. Sulphuric acid can result in the formation of sulphates of low solubility which cannot easily be removed from the product after leaching.

Acid leaching may be conducted batchwise or continuously, in a single stage or multiple stages, with cocurrent or countercurrent flow of solids and leach liquors between stages.

Effectively complete removal of some additives can be achieved if desired, although complete removal of additives my not be desirable where the additives are useful in glaze formulations and such removal can be avoided.

The leach step has the beneficial impact of removing some colorant and other deleterious impurities and of enhancement of product opacifying effect.

At the conclusion of the leach step the leach liquor may be separated from the mineral by any suitable means, including thickening, filtration and washing.

The mineral product may then be washed and thereafter dried and calcined for removal of moisture and chemically combined water by any suitable means.

Special care may be needed in many circumstances in leaching and solid/liquid separation to avoid the adverse effects of the uptake of silica into solution and the consequent formation of silica gels from which the product cannot easily be recovered. Crystallisation catalysts have been found to be useful in this regard, while careful control of acid strength and temperature in leaching can be used to avoid gel formation, both by avoiding silica solution and by avoiding hydrolysis of gel from solution.

In a particular embodiment of the present invention it has been discovered that the addition of calcium oxide bearing compounds such as lime, wollastonite and limestone to zircon prior to the thermal treatment step can result in the formation of particularly useful phase assemblages for imparting opacifying ability to the final product of processing for a small amount of additive. In particular, calcium zircosilicate ($Ca_2ZrSi_4O_{12}$) and zirconia are formed when the thermal treatment step is carried out effectively, resulting in complete conversion of zircon to other phases for small calcia additions. Further, the mode of distribution of these phases is for the zirconia phase which is formed to be distributed as particles having a size distribution in the range of 0.5 to 10 microns within a matrix of the zircosilicate phase. Under many circumstances the largest particle size of the zirconia will be less than about 4 microns. Whether or not the product of the thermal treatment step is subsequently leached it has been found that after light milling (e.g. to pass 25 microns) its incorporation into glaze results in a significant opacifying effect, when the glaze is fired as the finely dispersed zirconia is liberated into the general glaze and partially dissolves and reacts to for micron and submicron sized zircon.

In a further embodiment of the present invention it has been discovered that the addition of calcium oxide bearing compounds such as lime, wollastonite and limestone, optionally in combination with silica, to zircon prior to the thermal treatment step can result in the formation of particularly useful phase assemblages for imparting opacifying ability to the final product of processing where a leach step is employed. In particular, the relative production of calcium zircosilicate in the thermal treatment step can be controlled by selection of such additive regimes. The calcium zircosilicate can subsequently be made to decompose during leaching, liberating fine chemically precipitated zirconia which can impart opacity when the product is incorporated into glaze formulations and the glaze formulations are fired, again by the formations of dispersed micron to submicron sized zircon, without the need to conduct micronising.

The following examples and comparative examples further illustrate the invention.

EXAMPLE 1:

Zircon having the composition and size distribution provided in Table 1 was mixed with technical grade hydrated borax, hydrated lime (see Table 2), silica flour and watering the weight proportions 100:1.5:30:12.5:10.0 in a laboratory blender and dried at 100° C. for several hours in a drying oven. The effect of the treatment was to form dry nodules of well mixed material in the particle size range 0.5 to 4.0 mm.

The dried material was transferred to a crucible and placed in a muffle furnace which was heated to 1300° C., at which temperature it was maintained for one hour. After this time the contents of the crucible were immediately poured into cold water to effect quench cooling. X ray diffraction indicated that the roasted product contained both zirconia and calcium zircosilicate phases. Electron microscopy indicated that the zirconia phase was suspended as 0.5 to 4 micron particles in a matrix of calcium zircosilicate. A small amount of glassy phase was also present.

The quenched roasted material was dried and then ground in a zirconia lined pulveriser to 80% passing 20 microns (full particle size distribution given in Table 3). The ground material was then mixed with kaolin and ground commercial frit (passing 20 microns, composition given in Table 4) in the weight proportions 20:10:90 and slurried into a slip which was sprayed onto a preweighed base of commercial tile bisque. The coated tile was dried in a drying oven and the glaze application rate was measured by weighing the dried coated bisque.

The dried coated bisque was placed into a muffle furnace in which it was slowly heated at 1080° C., at which temperature it was maintained for an hour before being allowed to cool slowly by turning off the muffle furnace.

The fired glazed tile was subjected to colorimetric analysis using a Minolta colorimeter providing the standard L,a,b method of describing colour.

The above procedure was repeated, replacing the roasted product with standard micronised zircon, the size distribution of which is provided in Table 5.

The results of the colorimetric tests are provided in Table 6. Clearly the lightly ground roasted product has been almost as effective in covering the colour characteristics of the bisque base as the micronised zircon, i.e. it has opacifying properties and is almost as effective as a glaze opacifier at high cost micronised zircon.

EXAMPLE 2:

A sample of the roasted material of example I was subjected to leaching with boiling excess 10% hydrochloric acid under reflux. The leach residue was filtered from the leach liquor and washed with 10% hydrochloric acid. After drying at 150° C. the leach residue had the composition provided in Table 7 for a weight loss in leaching of 24.64%.

The leach residue was then used in a glaze formulation in the same manner as for the roasted product of Example 1. A comparison of the glaze characteristics with those of a glaze formed from micronised zircon is provided in Table 8.

Clearly the roasted, leached material is at least equally effective as an opacifier as is micronised zircon.

EXAMPLE 3:

Roasting of zircon with borax, lime, silica and water was conducted in a similar manner to that described in Example 1, with the exception that weight proportions of 100:1.5:66:30:18 were used in premixing. In this case the roasted product was found to contain predominantly zircon and calcium zircosilicate and a small amount of liquid phase. No separate phase of zirconia was present.

After roasting part of the roasted product was submitted directly to testing in glaze formulations in a manner similar to that which has been described in Example 1. Another part of the sample was leached, washed and dried in the manner which was described in Example 2 prior to testing in glaze formulations.

A comparison of the glaze characteristics for each of the glazes produced with those of a glaze formed from micronised zircon is provided in Table 9.

Clearly, while neither of the treated products has similar opacifying characteristics to micronised zircon the leached product has an opacifying effect, which effect is not matched by the unleached material. The unleached material has almost no opacifying effect. For a material which does not contain a finely distributed zirconia phase after roasting it is apparent that leaching can impart an opacifying effect.

TABLE 1

Composition of Zircon Used in Examples 1–3

| | Wt. % |
|---|---|
| $ZrO_2$ | 64.3 |
| $HfO_2$ | 1.40 |
| $SiO_2$ | 32.5 |
| $P_2O_5$ | 0.30 |
| $Y_2O_3$ | 0.31 |
| $La_2O_3$ | 0.006 |
| $CeO_2$ | 0.012 |
| $TiO_2$ | 0.11 |
| $Fe_2O_3$ | 0.14 |
| $Al_2O_3$ | 0.13 |
| $V_2O_5$ | 0.11 |
| CaO | 0.022 |
| MgO | 0.033 |

Size Distribution

| Size (μm) | Cum. % Passing |
|---|---|
| 50 | 90 |
| 40 | 37 |
| 30 | 4 |
| 20 | 1 |

TABLE 2

Composition of Hydrated Lime Used in Examples 1–3

| | Wt. % |
|---|---|
| Ca(OH)$_2$ | 94.0 |
| CaCO$_3$ | 1.5 |
| MgO | 1.0 |
| Fe$_2$O$_3$ | 0.5 |
| Al$_2$O$_3$ | 0.5 |
| SiO2 | 1.5 |

TABLE 3

Indicative Particle Size Distribution for Milled Roasted and Leached Products in Examples 1–3

| Size (μm) | Cum. Wt. % Passing |
|---|---|
| 22 | 85.1 |
| 15.6 | 78.3 |
| 11 | 72.1 |
| 5.5 | 57.2 |
| 1.4 | 12.0 |
| 1.0 | 4.0 |

TABLE 4

Composition of Frit Used in Glaze Formulations

| | Wt. % |
|---|---|
| SiO$_2$ | 57.5 |
| B$_2$O$_3$ | 14.2 |
| Na$_2$O | 5.9 |
| CaO | 11.6 |
| Al$_2$O$_3$ | 10.7 |

TABLE 5

Size Distribution of Standard Zircon Opacifier

| Size (μm) | Cum. Wt. % Passing |
|---|---|
| 10.7 | 93.5 |
| 5.07 | 77.1 |
| 2.17 | 44.7 |
| 1.03 | 22.0 |
| 0.49 | 7.6 |

TABLE 6

Colourimetric Results for Glazes of Example 1

| | Sample | | |
|---|---|---|---|
| Glaze | Roast | Standard Opacifier | Bisque |
| Loading, g cm$^{-2}$ | 0.132 | 0.109 | 0.0 |
| Colourimetric Data (%): | | | |
| L | 91.0 | 92.0 | 89.0 |
| a | 0.5 | 0.6 | 0.4 |
| b | 4.5 | 4.0 | 15.0 |

TABLE 7

Composition of Roast/Leach Product of Example 2

| | Wt. % |
|---|---|
| ZrO$_2$ | 59.5 |
| HfO$_2$ | 1.30 |
| SiO$_2$ | 32.7 |
| P$_2$O$_5$ | 0.16 |
| TiO$_2$ | 0.06 |
| Fe$_2$O$_3$ | 0.02 |
| CaO | 0.2 |

TABLE 8

Colourimetric Results for Glazes of Example 2

| | Sample | | |
|---|---|---|---|
| Glaze | Roast/Leach | Standard Opacifier | Bisque |
| Loading, g cm$^{-2}$ | 0.130 | 0.109 | 0.0 |
| Colourimetric Data (%): | | | |
| L | 92.5 | 92.0 | 89.0 |
| a | 0.5 | 0.6 | 0.4 |
| b | 3.8 | 4.0 | 15.0 |

TABLE 9

Colourimetric Results for Glazes of Example 3

| | Sample | | |
|---|---|---|---|
| Glaze | Roast | Roast/Leach | Standard Opacifier |
| Loading, g cm$^{-2}$ | 0.125 | 0.135 | 0.109 |
| Colourimetric Data (%): | | | |
| L | 87.4 | 89.0 | 92.0 |
| a | 0.6 | 0.65 | 0.6 |
| b | 13.8 | 9.1 | 4.0 |

We claim:

1. A process for producing a zirconia-bearing opacifier, comprising the steps of:
   a) heating a zirconia-bearing material in the presence of an additive selected from the group consisting of silica, a metal oxide which exhibits a preference for forming compounds with silica rather than zirconia, a metal compound which decomposes to form said metal oxide and mixtures thereof, to form a heat modified product comprising a zirconia phase and a phase comprising a compound of the metal, the additive and zirconia-bearing material being present in a weight ratio of less than about 1:1; and
   b) cooling the heat modified product to form a material comprising said zirconia phase exhibiting opacifying characteristics when incorporated into a glaze and he glaze is fired.

2. The process according to claim 1, wherein the zirconia-bearing material comprises zircon.

3. The process according to claim 1, wherein the additive comprises an oxide of a metal of Group I or Group II of the Periodic Table.

4. The process according to claim 3, wherein the metal oxide is calcium oxide.

5. The process according to claim 4, wherein the calcium oxide is derived from lime wollastonite or limestone.

6. The process according to claim 4, wherein the calcium oxide is added to the zirconia-bearing material in an amount sufficient that he heat modified product comprises zirconia and calcium zircosilicate.

7. The process according to claim 1, wherein he zirconia-bearing material comprises zircon, the additive comprises calcium oxide and the heating completely converts the zircon into zirconia and calcium zircosilicate phases.

8. The process according to claim 1, further comprising acid leaching the cooled, heat modified product to remove impurities and to decompose phases other than the zirconia phase to form a further zirconia phase and enhance opacifying effects.

9. The process according to claim 8, wherein the acid leaching is performed with an acid selected from the group consisting of hydrochloric acid and nitric acid.

10. The process according to claim 1, wherein the heating is carried out at a temperature of about 800° to 1800° C.

11. The process according to claim 1, wherein the zirconia phase has a particle size distribution of 0.5 to 10 microns.

12. The process according to claim 1, wherein the additive is present in an amount of less than 30% by weight of the zirconia-bearing material and additive.

13. A process for producing a zirconia-bearing opacifier, comprising the steps of:

a) heating a zirconia-bearing material in the presence of an additive selected from the group consisting of silica, a metal oxide which exhibits a preference for forming compounds with silica rather than zirconia, a metal compound which decomposes to form a said metal oxide and mixtures thereof, to form a heat modified product;

b) cooling the heat modified product; and c) acid leaching the cooled, heat modified product to remove impurities and to form a zirconia phase exhibiting opacifying characteristics.

14. The process according to claim 13, wherein the zirconia-bearing material comprises zircon.

15. The process according to claim 13, wherein the additive comprises an oxide of a metal of Group I or Group II of the Periodic Table.

16. The process according to claim 15, wherein the metal oxide is calcium oxide.

17. The process according to claim 13, wherein the acid leaching is performed with an acid selected from the group consisting of hydrochloric acid and nitric acid.

18. The process according to claim 13, wherein the heating is carried out at a temperature of about 800° to 1800° C.

19. The process according to claim 13, wherein the additive and zirconia-bearing material are present in the heating step in a weight ratio of less than about 1:1.

* * * * *